United States Patent
Tour et al.

(10) Patent No.: US 11,098,233 B2
(45) Date of Patent: Aug. 24, 2021

(54) CARBONACEOUS NANOPARTICLES AS CONDUCTIVITY ENHANCEMENT ADDITIVES TO WATER-IN-OIL EMULSIONS, OIL-IN-WATER EMULSIONS AND OIL-BASED WELLBORE FLUIDS

(71) Applicants: William Marsh Rice University, Houston, TX (US); M-I L.L.C., Houston, TX (US)

(72) Inventors: James M. Tour, Bellaire, TX (US); Gabriel Ceriotti, Houston, TX (US); Alexander Slesarev, Obninsk (RU); Ruquan Ye, Houston, TX (US); Katherine Price-Hoelscher, Houston, TX (US); Cara Bovet, Houston, TX (US); Jim Friedheim, Spring, TX (US); Steve Young, Cypress, TX (US)

(73) Assignees: WILLIAM MARSH RICE UNIVERSITY, Houston, TX (US); M-I L.L.C., Houston, TX (US)

( * ) Notice: Subject to any disclaimer, the term of this patent is extended or adjusted under 35 U.S.C. 154(b) by 0 days.

(21) Appl. No.: 14/649,604

(22) PCT Filed: Dec. 4, 2013

(86) PCT No.: PCT/US2013/073123
§ 371 (c)(1),
(2) Date: Jun. 4, 2015

(87) PCT Pub. No.: WO2014/089214
PCT Pub. Date: Jun. 12, 2014

(65) Prior Publication Data
US 2015/0368539 A1    Dec. 24, 2015

Related U.S. Application Data

(60) Provisional application No. 61/733,299, filed on Dec. 4, 2012, provisional application No. 61/800,366, filed on Mar. 15, 2013.

(51) Int. Cl.
*G01V 3/00* (2006.01)
*C09K 8/32* (2006.01)
(Continued)

(52) U.S. Cl.
CPC ............... *C09K 8/32* (2013.01); *C09K 8/03* (2013.01); *E21B 47/12* (2013.01); *G01V 3/18* (2013.01); *G01V 3/24* (2013.01); *C09K 2208/10* (2013.01)

(58) Field of Classification Search
CPC ........ C09K 8/32; C09K 8/03; C09K 2208/10; E21B 47/12; G01V 3/18; G01V 3/24
(Continued)

(56) References Cited

U.S. PATENT DOCUMENTS 4,012,329 A    3/1977   Hayes et al.
5,851,280 A   12/1998   Belmont et al.
(Continued)

FOREIGN PATENT DOCUMENTS

WO   WO-2010/022164 A1   2/2010
WO   WO-201014786 A1    2/2010
(Continued)

OTHER PUBLICATIONS

International Search Report and Written Opinion for PCT/US2013/073123, dated Jul. 9, 2014.
(Continued)

*Primary Examiner* — Dhaval V Patel

(57) ABSTRACT

Various embodiments of the present disclosure provide methods of making wellbore fluids with enhanced electrical conductivities. In some embodiments, such methods comprise: (1) pre-treating a carbon material with an acid; and (2) adding the carbon material to the wellbore fluid. Further embodiments of the present disclosure pertain to wellbore fluids formed by the methods of the present disclosure.
(Continued)

Additional embodiments of the present disclosure pertain to methods for logging a subterranean well by utilizing the aforementioned wellbore fluids.

24 Claims, 8 Drawing Sheets

(51) Int. Cl.
| | | |
|---|---|---|
| *C09K 8/03* | (2006.01) | |
| *G01V 3/24* | (2006.01) | |
| *E21B 47/12* | (2012.01) | |
| *G01V 3/18* | (2006.01) | |

(58) Field of Classification Search
USPC ... 340/854.3, 32, 584, 933, 539.1, 628, 511, 340/605, 521, 539.11, 691.5, 501, 570.07
See application file for complete search history.

(56) References Cited

U.S. PATENT DOCUMENTS

| | | |
|---|---|---|
| 6,239,183 B1 | 5/2001 | Farmer et al. |
| 6,506,710 B1 | 1/2003 | Hoey et al. |
| 6,586,327 B2 | 7/2003 | Shepard |
| 6,770,603 B1 | 8/2004 | Sawdon et al. |
| 7,060,661 B2 | 6/2006 | Dobson, Sr. et al. |
| 7,176,165 B2 | 2/2007 | Massam et al. |
| 7,303,018 B2 | 12/2007 | Cawiezel et al. |
| 7,510,009 B2 | 3/2009 | Cawiezel et al. |
| 8,183,180 B2 | 5/2012 | Tour et al. |
| 8,626,133 B2 | 1/2014 | Kuhlke et al. |
| 8,703,090 B2 | 4/2014 | Tour et al. |
| 2004/0127366 A1 | 7/2004 | Bradbury et al. |
| 2005/0101493 A1 | 5/2005 | Bradbury et al. |
| 2006/0188651 A1 | 8/2006 | Bradbury et al. |
| 2008/0064613 A1 | 3/2008 | Massam et al. |
| 2008/0286559 A1 | 11/2008 | Lee et al. |
| 2010/0009874 A1 | 1/2010 | Ballard et al. |
| 2010/0096595 A1 | 4/2010 | Prud'Homme et al. |
| 2010/0105834 A1 | 4/2010 | Tour et al. |
| 2010/0300759 A1 | 12/2010 | Passade-Boupat et al. |
| 2011/0059871 A1* | 3/2011 | Tour ...................... B82Y 30/00 507/137 |
| 2011/0111988 A1* | 5/2011 | Ionescu Vasii .......... C09K 8/34 507/103 |
| 2011/0159372 A1 | 6/2011 | Zhamu et al. |
| 2011/0254553 A1 | 10/2011 | van Zanten |
| 2012/0015852 A1 | 1/2012 | Quintero et al. |
| 2012/0181020 A1 | 7/2012 | Barron et al. |
| 2012/0245058 A1 | 9/2012 | Monteiro et al. |
| 2015/0057417 A1 | 2/2015 | Tour et al. |

FOREIGN PATENT DOCUMENTS

| | | |
|---|---|---|
| WO | WO-2011078639 A2 | 6/2011 |
| WO | WO-2013040356 A1 | 3/2013 |

OTHER PUBLICATIONS

International Preliminary Report on Patentability for PCT/US2013/073123, dated Jun. 18, 2015.
European Search Report for EP 13861158.7, dated Aug. 4, 2016.
Dimiev et al. "Reversible Formation of Ammonium Persulfate/Sulfuric Acid Graphite Intercalation Compounds and Their Peculiar Raman Spectra," ACS Nano 2012, 6, 7842-7849.
Dimiev et al., "Direct Real-Time Monitoring of Stage Transitions in Graphite Intercalation Compounds", ACS Nano, 2013, 7 (3), pp. 2773-2780.
Gizzatov et al., "Highly Water soluble Multi-layer Graphene Nanoribbons and Related Honey-Comb Carbon Nanostructures," Chem. Commun. 2012, 48, 5602-5604.
Higginbotham et al., "Low-Defect Graphene Oxide Oxides from Multiwalled Carbon Nanotubes," ACS Nano 2010, 4, 2059-2069.
Kosynkin et al., "Highly Conductive Graphene Oxides by Longitudinal Splitting of Carbon Nanotubes Using Potassium Vapor," ACS Nano 2011, 5, 968-974.
Dimiev et al., "Stable Aqueous Colloidal Solutions of Intact Surfactant-Free Graphene Nanoribbons and Related Graphitic Nanostructures," Chem. Commun., 2013, 49, 2613-2615.
Communication pursuant to Article 94(3) EPC, European Appl. No. 13861158.7, dated Feb. 8, 2018.
Office Action for Chinese Application No. 201380071256.5, dated Jul. 17, 2017.

* cited by examiner

CARBONACEOUS NANOPARTICLES AS CONDUCTIVITY ENHANCEMENT ADDITIVES TO WATER-IN-OIL EMULSIONS, OIL-IN-WATER EMULSIONS AND OIL-BASED WELLBORE FLUIDS

CROSS-REFERENCE TO RELATED APPLICATIONS

This application claims priority to U.S. Provisional Patent Application No. 61/733,299, filed on Dec. 4, 2012, and U.S. Provisional Patent Application No. 61/800,366, filed on Mar. 15, 2013. The entirety of each of the aforementioned applications is incorporated herein by reference.

STATEMENT REGARDING FEDERALLY SPONSORED RESEARCH

Not applicable

BACKGROUND

The low electrical conductivity of certain wellbore fluids (e.g., oil-based drilling fluids) presents a problem for many drilling and logging operations, especially for operations that require the use of electrically conductive media. Therefore, a need exists for the development of wellbore fluids with enhanced electrical conductivity.

SUMMARY

In some embodiments, the present disclosure provides methods of making wellbore fluids with enhanced electrical conductivities. In some embodiments, such methods comprise: (1) pre-treating a carbon material with an acid; and (2) adding the carbon material to the wellbore fluid. In some embodiments, the acid is selected from the group consisting of hypophosphorous acid, hydrochloric acid, phosphoric acid, sulfuric acid, and combinations thereof. In some embodiments, the methods of the present disclosure may also include one or more steps of: (3) functionalizing the carbon materials with one or more functionalizing agents; (4) intercalating the carbon materials with one or more intercalation agents; (5) exfoliating the carbon materials; and (6) dispersing the carbon materials in the wellbore fluid.

In some embodiments, the carbon materials may comprise from about 0.0001% to about 10% by volume of the wellbore fluid. In some embodiments, the carbon materials are selected from the group consisting of graphene, graphite, graphite oxide, graphene oxide, graphene nanoribbons, graphene oxide nanoribbons, carbon black, carbon nanotubes, amorphous carbons, nanodiamonds, graphene quantum dots, graphite platelets, graphite nano-platelets, exfoliated graphite nano-platelets, thermally expanded graphite, and combinations thereof. In some embodiments, the carbon materials comprise graphite, such as graphite pre-treated with hypophosphoric acid, graphite intercalated with one or more intercalation agents to form graphite intercalation complexes, exfoliated graphite, graphite functionalized with a plurality of functional groups (e.g., aniline groups), and combinations thereof.

In some embodiments, the methods of the present disclosure yield wellbore fluids with enhanced electrical conductivities of at least about 10% at frequencies ranging from about 1 kHz to about 5 GHz. In some embodiments, the electrical conductivities of the wellbore fluids are enhanced by at least about 50% at frequencies ranging from about 1 kHz to about 5 GHz. In some embodiments, the wellbore fluids are selected from the group consisting of water-in-oil emulsions, oil-in-water emulsions, oil-based fluids, oil-based muds (OBMs), and combinations thereof. In some embodiments, the wellbore fluids comprise oil-based muds (OBMs).

Further embodiments of the present disclosure pertain to wellbore fluids with enhanced electrical conductivities, such as the wellbore fluids formed by the methods of the present disclosure. In some embodiments, the wellbore fluids include a carbon material pre-treated with an acid, such as hypophosphorous acid. In some embodiments, the carbon materials in the wellbore fluids may be selected from the group consisting of graphene, graphite, graphite oxide, graphene oxide, graphene nanoribbons, graphene oxide nanoribbons, carbon black, carbon nanotubes, amorphous carbons, nanodiamonds, graphene quantum dots, and combinations thereof. In some embodiments, the carbon materials in the wellbore fluids may include graphite, such as graphite pre-treated with hypophosphoric acid, graphite intercalated with one or more intercalation agents to form graphite intercalation complexes, exfoliated graphite, graphite functionalized with a plurality of functional groups (e.g., aniline groups), and combinations thereof.

Additional embodiments of the present disclosure pertain to methods for logging a subterranean well. In some embodiments, the methods for logging a subterranean well include: (1) placing into the subterranean well a logging medium; and (2) acquiring a log of the subterranean well. In some embodiments, the logging medium comprises the wellbore fluids of the present disclosure.

DETAILED DESCRIPTION

Figure 1:
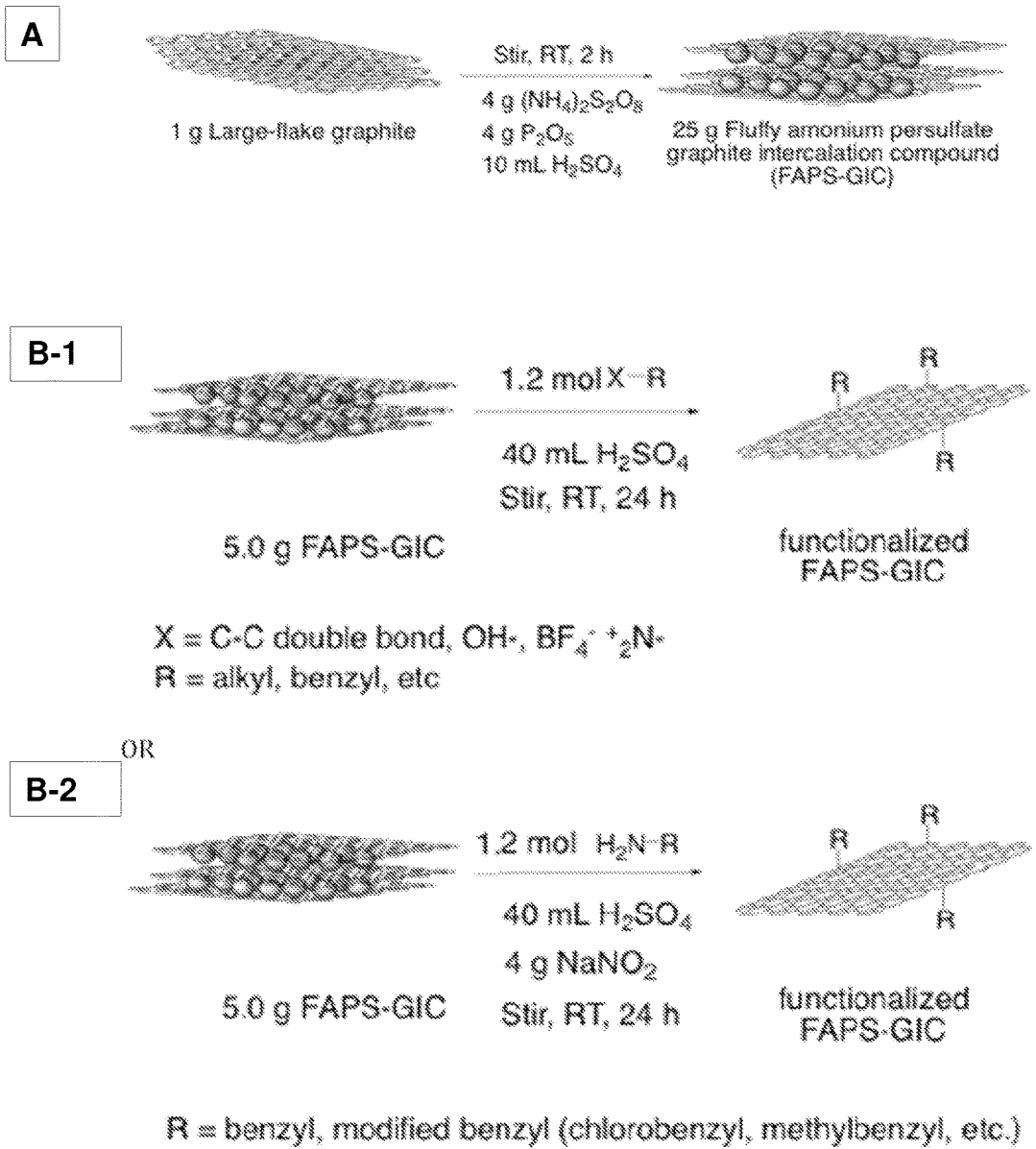
FIG. 1 provides schemes for the synthesis of carbon materials. First, about 1 g of large flake graphite was intercalated with ammonium persulfate to form a fluffy ammonium persulfate graphite intercalation compound (FAPS-GIC, FIG. 1A). Next, the FAPS-GIC was functionalized with various functional groups (including 4-fluoroaniline) to form various functionalized forms of FAPS-GIC (including fluoroaniline-functionalized FAPS-GIC or F-FAPS-GIC, FIGS. 1B-1 and 1B-2).

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Oil-based wellbore fluids (also known as oil-based muds (OBMs)) can be desirable for many oil and gas applications. In particular, OBMs find numerous applications in shale-rich environments during drilling and logging operations for oil and gas exploration. However, the low electrical conductivity of OBMs presents a problem for many drilling operations that require the use of an electrically conductive medium. For instance, resistivity logging or logging-while-drilling (LWD) is a method where the formation being drilled is characterized by measuring its electrical conductivity. Therefore, a need exists for the development of wellbore fluids with enhanced electrical conductivity.

In some embodiments, the present disclosure provides methods of making wellbore fluids with enhanced electrical conductivity. In further embodiments, the present disclosure pertains to wellbore fluids that have enhanced electrical conductivity. Additional embodiments of the present disclosure pertain to methods for logging a subterranean well by utilizing the wellbore fluids of the present disclosure.

Methods of Making Wellbore Fluids

In some embodiments, the present disclosure pertains to methods of making wellbore fluids with enhanced electrical conductivity. In some embodiments, the methods generally include: (1) pre-treating a carbon material with an acid; and (2) adding the carbon material to the wellbore fluid. Further embodiments of the present disclosure can also include one or more steps of: (3) functionalizing the carbon materials with one or more functionalizing agents; (4) intercalating the carbon materials with one or more intercalation agents; (5) exfoliating the carbon materials; and (6) dispersing the carbon materials in the wellbore fluids. In some embodiments, one or more of the aforementioned steps may occur at the same time or during a same process. In some embodiments, one or more of the aforementioned steps may occur sequentially, or as part of separate processes. In various embodiments, one or more of the aforementioned steps may also be followed by subsequent filtration, washing, or purification steps. Each of the aforementioned steps may also be repeated more than once.

As set forth in more detail herein, the methods of the present disclosure may utilize various acids, carbon materials, functionalizing agents, intercalation agents, and wellbore fluids in various manners. Furthermore, the methods of the present disclosure may be utilized to make various types of wellbore fluids.

Acid Treatment

In some embodiments, the carbon materials of the present disclosure may be treated with one or more acids. In some embodiments, the one or more acids may include, without limitation, hypophosphorous acid, hydrochloric acid, phosphoric acid, sulfuric acid, fuming sulfuric acid, chlorosulfonic acid, and combinations thereof. In some embodiments, the carbon materials of the present disclosure may be treated with hypophosphorous acid.

Various methods may be used to treat the carbon materials of the present disclosure with acid. Exemplary methods are described in: U.S. Prov. Pat. App. No. 61/656,613, "Stable Aqueous Dispersions of Carbon Materials Following Treatment with an Acid and Applications thereof" (filed on Jun. 7, 2012); Gizzatov et al., "Highly Water soluble Multi-layer Graphene Nanoribbons and Related Honey-Comb Carbon Nanostructures" (*Chem. Commun.* 2012, 48, 5602-5604); and Dimiev et al., "Stable Aqueous Colloidal Solutions of Intact Surfactant-Free Graphene Nanoribbons and Related Graphitic Nanostructures," *Chem. Commun.*, 2013, 49, 2613-2615. DOI: 10.1039/c3cc40424b.

In some embodiments, the carbon materials of the present disclosure may be filtered after the acid treatment. In some embodiments, the carbon materials of the present disclosure may be washed with a solvent after the acid treatment. In some embodiments, the carbon materials of the present disclosure may be sonicated after the acid treatment. In some embodiments, the carbon materials of the present disclosure may not undergo any post-processing steps after acid treatment.

Functionalization

In some embodiments, the methods of the present disclosure may also include a step of functionalizing the carbon materials with one or more functionalizing agents. In some embodiments, the functionalizing occurs prior to adding the carbon materials to the wellbore fluid. In some embodiments, the functionalizing agents may include, without limitation, phenyl groups, aniline groups, alkanes, alkyl groups, aryl groups, tert-butyl groups, alkenyl groups, alkynyl groups, ester groups, carboxyl groups, halogens, metals, metal oxides, metal sulfides, sulfate groups, and combinations thereof.

In some embodiments, the functional groups may be appended to carbon materials through diazonium reactions. In some embodiments, the functional groups may be appended to the carbon materials through other functionalization protocols, such as radical reactions (e.g., radical reaction with alkyl and aryl units), oxy-radical reactions (e.g., oxy-radical reactions with alkoxides and hydroxyradicals), cationic additions (e.g., cationic addition of carbocations), and combinations thereof. Additional methods of functionalizing carbon materials can also be envisioned.

Intercalation

In some embodiments, the methods of the present disclosure may also include a step of intercalating the carbon materials with one or more intercalation agents. In some embodiments, the intercalation occurs prior to adding the carbon materials to the wellbore fluid. In some embodiments, the intercalation agents may include, without limitation, small molecules, metals, functional groups, and combinations thereof. In some embodiments, the intercalation agents may include ammonium persulfate.

Exfoliation

In some embodiments, the methods of the present disclosure may also include a step of exfoliating the carbon materials. In some embodiments, the exfoliating of the carbon materials may occur prior to adding the carbon material to the wellbore fluid. In some embodiments, the exfoliating may occur after adding the carbon materials to the wellbore fluid. In some embodiments, exfoliation occurs by sonication of the carbon materials. In some embodiments, the exfoliation may occur as a result of treating the carbon materials with acid. In some embodiments, the exfoliation may occur by subjecting the material to shear.

Dispersion

In some embodiments, the methods of the present disclosure may also include a step of dispersing the carbon materials in the wellbore fluids. In some embodiments, the carbon materials are dispersed in the wellbore fluids by sonication. In some embodiments, the carbon materials are dispersed in the wellbore fluid by adding one or more dispersing agents to the wellbore fluids. In some embodiments, the carbon materials are dispersed in the wellbore fluid by applying shear. In some embodiments, the dispersing agents may include, without limitation, Triton X, sodium dodecyl sulfate (SDS), sodium stearate, dodecylbenzenesulfonates, X-114, CHAPS, DOC, NP-40, cetyl trimethylammonium bromide (CTAB), tetradecyltrimethylammonium bromide (TTAB), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldimethylammonium bromide (DODAB), MUL-XT™, and combinations thereof.

Carbon Materials

The methods and wellbore fluids of the present disclosure can utilize and modify various types of carbon materials. Carbon materials generally refer to carbon-based compositions that can enhance the electrical conductivities of wellbore fluids. In some embodiments, the carbon materials may include at least one of graphenes, graphites, graphite oxides, graphene oxides, graphene nanoribbons, graphene oxide nanoribbons, carbon blacks, carbon nanotubes, amorphous carbons, nanodiamonds, graphene quantum dots, graphite platelets, graphite nano-platelets, exfoliated graphite nano-platelets, thermally expanded graphite, and combinations thereof. In further embodiments, the carbon materials of the present disclosure may include diamonds, buckminster fullerenes, glassy carbon, carbon nanofoams, lonsdaleite, linear acetylenic carbon, chaoite, and combinations thereof.

In some embodiments, the carbon materials of the present disclosure may be in unfunctionalized or pristine form. In some embodiments, the carbon materials of the present disclosure may be functionalized with one or more functionalizing agents.

In more specific embodiments, the carbon materials of the present disclosure include graphite. In some embodiments, the graphite can include graphite intercalation complexes (GICs). In some embodiments, the GICs may be intercalated with various materials, such as small molecules, metals, functional groups, and combinations thereof. In some embodiments, the GICs may be intercalated with ammonium persulfate. In some embodiments, the GICs of the present disclosure may have undergone an intercalation reaction once. In some embodiments, the GICs of the present disclosure may have undergone an intercalation reaction several times. For instance, in some embodiments, the GICs of the present disclosure may have been intercalated, quenched, and washed consecutively for 3-4 times. See, e.g., Dimiev et al. "Reversible Formation of Ammonium Persulfate/Sulfuric Acid Graphite Intercalation Compounds and Their Peculiar Raman Spectra," *ACS Nano* 2012, 6, 7842-7849. DOI: 10.1021/nn3020147; and Dimiev et al., "Direct Real-Time Monitoring of Stage Transitions in Graphite Intercalation Compounds" (ASAP DOI: 10.1021/nn400207e)

In some embodiments, the carbon materials of the present disclosure include exfoliated graphite. In some embodiments, the carbon materials of the present disclosure can include graphite that has been functionalized with a plurality of functional groups. In some embodiments, the functional groups may include at least one of phenyl groups, aniline groups, alkanes, alkyl groups, aryl groups, tert-butyl groups, alkenyl groups, alkynyl groups, ester groups, carboxyl groups, halogens, metals, metal oxides, metal sulfides, sulfate groups, nitrophenyls, and combinations thereof.

In further embodiments, the carbon materials of the present disclosure include graphite that has been intercalated and exfoliated. In some embodiments, the graphite is intercalated and exfoliated by utilizing sonication and acid treatment, as described in: U.S. Prov. Pat. App. No. 61/656,613, "Stable Aqueous Dispersions of Carbon Materials Following Treatment with an Acid and Applications thereof" (filed on Jun. 7, 2012); and Gizzatov et al., "Highly Water soluble Multi-layer Graphene Nanoribbons and Related Honey-Comb Carbon Nanostructures" (*Chem. Commun.* 2012, 48, 5602-5604).

In more specific embodiments, the carbon materials of the present disclosure may include graphite that has been functionalized with dodecane. In some embodiments, the carbon materials of the present disclosure may include graphite that has been functionalized with one or more aniline groups. In some embodiments, the aniline groups may include, without limitation, anilines, fluoroanilines, bromoanilines, chloroanilines, nitroanilines, alkylanilines, methylanilines, and combinations thereof. In some embodiments, the carbon materials of the present disclosure may include graphite intercalation complexes that have been functionalized with one or more aniline groups, such as fluoroanilines, nitroanilines, bromoanilines, chloroanilines, methyl-anilines, and combinations thereof.

In some embodiments, the carbon materials of the present disclosure may include graphene nanoribbons (GNRs). In some embodiments, the graphene nanoribbons may include, without limitation, functionalized graphene nanoribbons, pristine graphene nanoribbons, doped graphene nanoribbons, functionalized graphene oxide nanoribbons, pristine graphene oxide nanoribbons, doped graphene oxide nanoribbons, reduced graphene oxide nanoribbons (also referred to as chemically converted graphene), stacked graphene nanoribbons, and combinations thereof.

In some embodiments, the carbon materials of the present disclosure may include one or more functionalized graphene nanoribbons. In some embodiments, the graphene nanoribbons may be functionalized on the edges (i.e., edge-functionalized). In some embodiments, the graphene nanoribbons may be functionalized on the sidewalls. In some embodiments, the graphene nanoribbons may be functionalized on the edges and the sidewalls. In various embodiments, functionalized graphene nanoribbons may include, without limitation, hexadecylated-GNRs (HD-GNRs), octylated-GNRs (O-GNRs), butylated-GNRs (B-GNRs), and combinations thereof.

In some embodiments, the functionalized graphene nanoribbons include polymer-functionalized graphene nanoribbons. In some embodiments, the polymer-functionalized graphene nanoribbons are edge-functionalized. In some embodiments, the polymer-functionalized graphene nanoribbons are functionalized with vinyl polymers. In some embodiments, the vinyl polymers may include at least one of polyethylene, polystyrene, polyvinyl chloride, polyvinyl acetate, polyvinyl alcohol, polyacrylonitrile, and combinations thereof. In some embodiments, the polymer-functionalized graphene nanoribbons may be functionalized with poly(ethylene oxides) (also known as poly(ethylene glycols)). In more specific embodiments, the polymer-functionalized graphene nanoribbons may include polyethylene oxide-functionalized graphene nanoribbons (PEO-GNRs).

In some embodiments, the carbon materials of the present disclosure may include graphene nanoribbons formed by splitting carbon nanotubes. In some embodiments, the carbon nanotubes may have been split by exposure to potassium, sodium, lithium, alloys thereof, metals thereof, salts thereof, and combinations thereof. For instance, in some embodiments, the splitting may occur by exposure of the carbon materials to a mixture of sodium and potassium alloys, a mixture of potassium and naphthalene solutions, and combinations thereof. Additional variations of such embodiments are described in U.S. Provisional Application No. 61/534,553, entitled "One Pot Synthesis of Functionalized Graphene Oxide and Polymer/Graphene Oxide Nanocomposites." Also see PCT/US2012/055414, entitled "Solvent-Based Methods For Production Of Graphene Nanoribbons." Also see Higginbotham et al., "Low-Defect Graphene Oxide Oxides from Multiwalled Carbon Nanotubes," *ACS Nano* 2010, 4, 2059-2069. Also see Applicants' co-pending U.S. patent application Ser. No. 12/544,057 entitled "Methods for Preparation of Graphene Oxides From Carbon Nanotubes and Compositions, Thin Composites and Devices Derived Therefrom." Also see Kosynkin et al., "Highly Conductive Graphene Oxides by Longitudinal Splitting of Carbon Nanotubes Using Potassium Vapor," *ACS Nano* 2011, 5, 968-974. Also see WO 2010/14786A1.

In some embodiments, the carbon materials of the present disclosure may include carbon black. In some embodiments, the carbon black may include, without limitation, functionalized carbon black, un-functionalized carbon black, conductive carbon black, oxidized carbon black, and combinations thereof. In some embodiments, the carbon materials of the present disclosure may include conductive carbon black.

In some embodiments, the carbon materials of the present disclosure may also include carbon nanotubes. In some embodiments, the carbon nanotubes may include, without limitation, single-walled carbon nanotubes, multi-walled carbon nanotubes, double-walled carbon nanotubes, triple-walled carbon nanotubes, few-walled carbon nanotubes, ultra-short carbon nanotubes, and combinations thereof. In some embodiments, the carbon materials of the present disclosure may include multi-walled carbon nanotubes.

In further embodiments, the carbon materials of the present disclosure may include graphene-based or graphite-based carbon materials. In some embodiments, the graphene-based or graphite-based carbon materials may include, without limitation, graphene nanoribbons, chemically converted graphene, chemically converted graphene prepared by a reduction of graphite oxide, chemically-converted graphene functionalized with a plurality of aryl groups, graphene functionalized with a plurality of aryl groups, functionalized graphite oxide, graphite oxide functionalized through esterification or amidation of carboxylic acid groups, graphite oxides comprising alkylated aryloxy groups, graphite oxides comprising opened epoxides, graphite oxides comprising epoxides opened with alkyl groups, graphite oxides comprising epoxides opened with amines, reduced graphite oxides comprising esterified carboxyl groups, reduced graphite oxides comprising aminated carboxyl groups, and combinations thereof. Additional suitable graphene-based or a graphite-based carbon materials are disclosed in U.S. Pat. No. 8,183,180, entitled "Graphene compositions and drilling fluids derived therefrom."

Wellbore Fluids

In some embodiments, the present disclosure pertains to wellbore fluids. In some embodiments, the wellbore fluids include one or more of the carbon materials of the present disclosure, as previously described in this application.

Carbon Materials

In some embodiments, the wellbore fluids of the present disclosure include one or more carbon materials pre-treated with an acid. In some embodiments, the acid includes at least one of hypophosphorous acid, hydrochloric acid, phosphoric acid, sulfuric acid, fuming sulfuric acid, chlorosulfonic acid, and combinations thereof. In some embodiments, the acid is hypophosphorous acid.

In some embodiments, the carbon materials in the wellbore fluids of the present disclosure are functionalized with one or more functionalizing agents. In some embodiments, the functionalizing agents include at least one of phenyl groups, aniline groups, alkanes, alkyl groups, aryl groups, tert-butyl groups, alkenyl groups, alkynyl groups, ester groups, carboxyl groups, halogens, metals, metal oxides, metal sulfides, sulfate groups, nitrophenyls, and combinations thereof.

In some embodiments, the carbon materials in the wellbore fluids of the present disclosure are intercalated with one or more intercalation agents. In some embodiments, the intercalation agents include at least one of small molecules, metals, functional groups, and combinations thereof.

In some embodiments, the carbon materials in the wellbore fluids of the present disclosure include exfoliated carbon materials, as previously described. In some embodiments, the carbon materials in the wellbore fluids of the present disclosure include at least one of graphene, graphite, graphite oxide, graphene oxide, graphene nanoribbons, graphene oxide nanoribbons, carbon black, carbon nanotubes, amorphous carbons, nanodiamonds, graphene quantum dots, graphite platelets, graphite nano-platelets, exfoliated graphite nano-platelets, thermally expanded graphite, and combinations thereof.

In some embodiments, the carbon materials in the wellbore fluids of the present disclosure include graphite. In some embodiments, the graphite is pre-treated with hypophosphorous acid. In some embodiments, the graphite is intercalated with one or more intercalation agents to form graphite intercalation complexes. In some embodiments, the graphite includes exfoliated graphite. In some embodiments, the graphite is functionalized with a plurality of functional groups, such as phenyl groups, aniline groups, alkanes, alkyl groups, aryl groups, tert-butyl groups, alkenyl groups, alkynyl groups, ester groups, carboxyl groups, halogens, metals, metal oxides, metal sulfides, sulfate groups, nitrophenyls, and combinations thereof. In some embodiments, the graphite is functionalized with a plurality of aniline groups, such as anilines, fluoroanilines, bromoanilines, chloroanilines, nitroanilines, alkylanilines, methylanilines, and combinations thereof.

In some embodiments, the carbon materials in the wellbore fluids of the present disclosure include graphene nanoribbons. In some embodiments, the graphene nanoribbons include at least one of functionalized graphene nanoribbons, pristine graphene nanoribbons, doped graphene nanoribbons, functionalized graphene oxide nanoribbons, pristine graphene oxide nanoribbons, doped graphene oxide nanoribbons, reduced graphene oxide nanoribbons, stacked graphene nanoribbons, and combinations thereof.

In some embodiments, the carbon materials in the wellbore fluids of the present disclosure include carbon black. In some embodiments, the carbon black includes at least one of functionalized carbon black, un-functionalized carbon black, conductive carbon black, oxidized carbon black, and combinations thereof.

In some embodiments, the carbon materials in the wellbore fluids of the present disclosure include carbon nanotubes. In some embodiments, the carbon nanotubes include at least one of single-walled carbon nanotubes, multi-walled carbon nanotubes, double-walled carbon nanotubes, triple-walled carbon nanotubes, few-walled carbon nanotubes, ultra-short carbon nanotubes, and combinations thereof.

In some embodiments, the carbon materials in the wellbore fluids of the present disclosure include a graphene-based or a graphite-based carbon material. In some embodiments, the graphene-based or graphite-based carbon material includes at least one of graphene nanoribbons, chemically converted graphene, chemically converted graphene prepared by a reduction of graphite oxide, chemically-converted graphene functionalized with a plurality of aryl groups, graphene functionalized with a plurality of aryl groups, functionalized graphite oxide, graphite oxide functionalized through esterification or amidation of carboxylic acid groups, graphite oxides comprising alkylated aryloxy groups, graphite oxides comprising opened epoxides, graphite oxides comprising epoxides opened with alkyl groups, graphite oxides comprising epoxides opened with amines, reduced graphite oxides comprising esterified carboxyl groups, reduced graphite oxides comprising aminated carboxyl groups, and combinations thereof.

The carbon materials of the present disclosure may be added to wellbore fluids to various final concentrations. For instance, in some embodiments, the carbon materials of the present disclosure may include from about 0.0001% to about 10% by volume of the wellbore fluid. In some embodiments, the carbon materials of the present disclosure may include from about 0.01% to about 5% by volume of the wellbore fluid. In some embodiments, the carbon materials of the present disclosure include from about 1% to about 5% by volume of the wellbore fluid. In some embodiments, the carbon materials may include about 1% by volume of the wellbore fluid.

Wellbore Fluids

The carbon materials of the present disclosure may be added to various types of wellbore fluids. Wellbore fluids generally refer to fluids that can be used to facilitate oil and gas exploration, such as the drilling of boreholes, completing wells, and preparing wells for production. In some embodiments, wellbore fluids may also be referred to as logging medium. In some embodiments, wellbore fluids may include any type of oil fluid. In various embodiments, wellbore fluids may include, without limitation, water-in-oil emulsions, oil-in-water emulsions, oleaginous-based drilling fluids, non-oleaginous-based drilling fluids, emulsion-based drilling fluids, invert-emulsion-based drilling fluids, conductive drilling fluids, magnetic drilling fluids, oil-based wellbore fluids, oil-based muds (OBMs), water-in-oil invert emulsions, oil-in-water direct emulsions, and combinations of such fluids. In some embodiments, the wellbore fluids of the present disclosure include oil-based muds.

In some embodiments, the wellbore fluids of the present disclosure include an oleaginous fluid as the continuous phase of an invert emulsion. Suitable oil-based or oleaginous fluids may be natural or synthetic oils. In some embodiments, the oleaginous fluid may include diesel oil; mineral oil; a synthetic oil, such as hydrogenated and unhydrogenated olefins including polyalpha olefins, linear olefins, branched olefins, linear brand branched paraffins, polydiorganosiloxanes, siloxanes, organosiloxanes, esters of fatty acids such as straight chain, branched and cyclical alkyl ethers of fatty acids; and combinations thereof.

In other embodiments, the wellbore fluid may be an invert emulsion having a continuous oleaginous phase and a discontinuous aqueous (or non-oleaginous liquid) phase, among other substances and additives. In some embodiments, the wellbore fluid may be a continuous oleaginous fluid with no internal phase. Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The amount of oleaginous liquid in the invert emulsion fluid may vary depending upon the particular oleaginous fluid used, the particular non-oleaginous fluid used, and the particular application in which the invert emulsion fluid is to be employed. However, in some embodiments, the amount of oleaginous liquid may be sufficient to form a stable emulsion when used as the continuous phase. In some embodiments, the amount of oleaginous liquid may be at least about 30, or at least about 40, or at least about 50 percent by volume of the total fluid. The amount of non-oleaginous liquid in the invert emulsion fluid may vary depending upon the particular non-oleaginous fluid used and the particular application in which the invert emulsion fluid is to be employed. In some embodiments, the amount of non-oleaginous liquid may be at least about 1, or at least about 3, or at least about 5 percent by volume of the total fluid. In some embodiments, the amount may not be so great that it cannot be dispersed in the oleaginous phase. Therefore, in certain embodiments, the amount of non-oleaginous liquid may be less than about 90, or less than about 80, or less than about 70 percent by volume of the total fluid.

The invert emulsion fluid may also possess a stable internal non-oleaginous phase within the external oleaginous phase. Specifically, upon application of an electric field to an invert emulsion fluid, the emulsified non-oleaginous phase, which possesses charge, can migrate to one of the electrodes used to generate the electric field. In some embodiments, the incorporation of emulsifiers in the invert emulsion fluid can stabilize the emulsion and result in a slowing of the migration rate and/or increased voltage for breakage of the emulsion. Thus, an electrical stability (ES) test, specified by the American Petroleum Institute at API Recommended Practice 13B-2, Third Edition (February 1998), can be used to determine the stability of the emulsion in some embodiments.

In some embodiments, ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 $\mu$A. The test is performed by inserting the ES probe into a cup of 120° F. [48.9° C.] mud applying an increasing voltage (from 0 to 2000 volts) across an electrode gap in the probe. The higher the ES voltage measured for the fluid, the stronger or harder would be to break the emulsion created with the wellbore fluid, and the more stable the emulsion is. In some embodiments, carbon materials of the present disclosure may impact the ES readings for the wellbore fluid. Therefore, in some embodiments, to achieve an accurate ES reading according to the practice described above, the ES reading can be obtained prior to adding carbon material to the wellbore fluid.

In some embodiments, the wellbore fluids of the present disclosure have a high internal phase ratio, where the emulsion droplet size is smaller as compared to conventional emulsion droplets. For example, the non-oleaginous phase distributed in the oleaginous phase may have an average diameter in the range of 0.5 to 5 microns in one embodiment, and in the range of 1 to 3 microns in a more particular embodiment. The droplet size distribution may be such that at least 90% of the diameters are within 20% or especially 10% of the average diameter. In other embodiments, there may be a multimodal distribution. This droplet size may be approximately one-third to one-fourth the size of emulsion droplets formed using conventional emulsifiers. In a particular embodiment, the emulsion droplets may be smaller than the solid weighting agents used in the wellbore fluids.

In some embodiments, the wellbore fluids of the present disclosure may include OBMs that include micro-emulsions. In some embodiments, the micro-emulsions may include invert micro-emulsions.

In some embodiments, the wellbore fluids of the present disclosure may also include additives. In some embodiments, the additives may include at least one of emulsifiers, wetting agents, organophilic clays, viscosifiers, weighting agents, bridging agents, fluid loss control agents, alkalinity agents, corrosion inhibitors, and combinations thereof.

In some embodiments, the wellbore fluids of the present disclosure may also include wetting agents or emulsifiers. In some embodiments, wetting agents or emulsifiers may include, without limitation, crude tall oil, oxidized crude tall oil, surfactants, organic phosphate esters, modified imidazolines and amidoamines, alkyl aromatic sulfates, sulfonates, derivatives thereof, and combinations thereof.

In some embodiments, the wellbore fluids of the present disclosure may include one or more commercially available emulsifiers. Examples of suitable commercially available emulsifiers manufactured and distributed by M-I SWACO (Houston, Tex.) that may be used in the wellbore fluids of the present disclosure can include, without limitation, VERSAWET™, VERSACOAT™, NOVAMUL™, FAZEMUL™, FAZEWET™, MEGAMUL™, SUREMUL™, ONEMUL™, MUL-XT™, and combinations thereof. Other suitable commercially available emulsifiers include SILWET™ series of emulsifiers, such as L-77, L-7001, L7605 and L-7622, which are distributed by Union Carbide Chemical Company, Inc. In some embodiments, suitable emulsifiers in the wellbore fluids of the present disclosure may include amidoamine surfactants, such as those described in U.S. Pat. Nos. 6,239,183; 6,506,710; 7,060,661; 7,303,018; and 7,510,009.

In other embodiments, suitable emulsifiers in the wellbore fluids of the present disclosure may be carboxylic acid-based emulsifiers, such as, for example, an emulsifier selected from dicarboxylic fatty acids, dimer acids, or dimers of fatty acids. Dicarboxylic fatty acids have the general formula HOOC—R—COOH. In some embodiments, R is an alkyl or alkenyl group containing from 10 to 50 carbon atoms, and in particular embodiments from 20 to 40 carbon atoms. In other embodiments, suitable emulsifiers in the wellbore fluids of the present disclosure may be selected from the dimerization products of unsaturated dicarboxylic fatty acids, such as products prepared by dimerization of unsaturated fatty acids containing from 8 to about 18 carbon atoms, including 9-dodecenoic(cis), 9-tetradecenoic(cis), 9-octadecenoic(cis), octadecatetranoic acids and the like.

In some embodiments, the wellbore fluids of the present disclosure may also include one or more organophilic clays. In some embodiments, the organophilic clays may be amine treated clays. In some embodiments, the organophilic clays may be useful as viscosifiers in the wellbore fluids of the present disclosure.

In some embodiments, the wellbore fluids of the present disclosure may also include viscosifiers and gellants, such as oil soluble polymers, polyamide resins, polycarboxylic acids, soaps, and combinations thereof. In some embodiments, attapulgite clays and sepiolite clays may also be used as viscosifiers in the wellbore fluids of the present disclosure. In some embodiments, the amount of viscosifier used in the wellbore fluids of the present disclosure may vary depending on downhole conditions, as understood by those skilled in the art. However, normally about 0.1% to 6% by weight range may be sufficient for most applications. VG-69™ and VG-PLUS™ are organoclays available from MI SWACO (Houston, Tex.), and VERSA-HRP™ is a polyamide resin material available from MI SWACO (Houston, Tex.) that may be used in the wellbore fluids of the present disclosure.

In some embodiments, the wellbore fluids of the present disclosure may also include one or more fluid loss control agents. Fluid loss control agents may act by coating the walls of a well. Suitable fluid loss control agents may include, without limitation, modified lignites, asphaltic compounds, gilsonite, organophilic humates or tannins prepared by reacting humic acid or tannic acid with amides or polyalkylene polyamines, amine-treated tannins such as ONE-TROL HT™, latex polymers, and combinations thereof. In embodiments, the fluid loss control agent may be selected from one or more of VERSATROL™, VERSA-TROL™, VERSALIG™, ECOTROL™ RD, ONETROL HT™, EMI 789, and NOVATECH™ F, which are all commercially available from MI SWACO (Houston, Tex.).

In some embodiments, the wellbore fluids of the present disclosure may also have one or more corrosion inhibitors. Corrosion inhibitors may be added to the wellbore fluids of the present disclosure to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, benzoic acid derivatives, phosphate esters, heterocyclic nitrogen and sulfur compounds, organic acids, and the like. Non-limiting examples of commercially available corrosion inhibitors include sodium benzoate and benzotriazole.

In some embodiments, the wellbore fluids of the present disclosure may also have one or more weighting agents or density materials. Weighting agents or density materials suitable for use in the wellbore fluids of the present disclosure include, without limitation, hematite, magnetite, iron oxides, illmenite, barite, siderite, celestite, dolomite, calcite, manganese oxides, halites and the like.

In some embodiments, the wellbore fluids of the present disclosure may include micronized weighting agents. In some embodiments, the micronized weighting agents may be coated with a dispersant. For example, in some embodiments, the wellbore fluids of the present disclosure may include dispersant coated micronized weighting agents. In some embodiments, the coated weighting agents may be formed by either a dry coating process or a wet coating process. Weighting agents suitable for use in the wellbore fluids of the present disclosure may include those disclosed in U.S. Patent Application Publication Nos. 2004/0127366, 2005/0101493, 2006/0188651; U.S. Pat. Nos. 6,586,372 and 7,176,165; and U.S. Provisional Application Ser. No. 60/825,156, each of which is hereby incorporated by reference.

In some embodiments, the weighting agent may be coated with dispersants that include, without limitation, oleic acid and polybasic fatty acids, alkylbenzene sulphonic acids, alkane sulphonic acids, linear alpha-olefin sulphonic acids, phospholipids such as lecithin, salts thereof and combinations thereof. In some embodiments, weighing agents may be coated with dispersants that include synthetic polymers, such as HYPERMER™ OM-1 (Imperial Chemical Industries, PLC, London, United Kingdom), polyacrylate esters, and the like. In some embodiments, polyacrylate esters may include polymers of stearyl methacrylate, butylacrylate, or the corresponding acids (e.g., methacrylic acids and/or acrylic acids). Other acrylate or other unsaturated carboxylic acid monomers (or esters thereof) may also be used.

In some embodiments, the quantity of the coated or uncoated weighting agent added to a wellbore fluid, if any, may depend upon the desired density of the wellbore fluid. For instance, in some embodiments, weighting agents may be added to result in a wellbore fluid density of up to about 22 pounds per gallon (ppg). In other embodiments, weighting agent may be added to achieve a wellbore fluid density of up to 20 ppg or up to 19.5 ppg.

The solid weighting agents may be of any particle size (and particle size distribution). In some embodiments, the wellbore fluids of the present disclosure may include weighting agents having a smaller particle size range than API grade weighing agents, which may generally be referred to as micronized weighting agents. Such weighting agents may generally be in the micron (or smaller) range, including submicron particles in the nanosized range.

In some embodiments, the average particle size (d50) of the weighting agents may range from a lower limit of greater than 5 nm, 10 nm, 30 nm, 50 nm, 100 nm, 200 nm, 500 nm, 700 nm, 0.5 micron, 1 micron, 1.2 microns, 1.5 microns, 3 microns, 5 microns, or 7.5 microns to an upper limit of less than 500 nm, 700 microns, 1 micron, 3 microns, 5 microns, 10 microns, 15 microns, 20 microns, where the particles may range from any lower limit to any upper limit. In other embodiments, the d90 (the size at which 90% of the particles are smaller) of the weighting agents may range from a lower limit of greater than 20 nm, 50 nm, 100 nm, 200 nm, 500 nm, 700 nm, 1 micron, 1.2 microns, 1.5 microns, 2 microns, 3 microns, 5 microns, 10 microns, or 15 microns to an upper limit of less than 30 microns, 25 microns, 20 microns, 15 microns, 10 microns, 8 microns, 5 microns, 2.5 microns, 1.5 microns, 1 micron, 700 nm, 500 nm, where the particles may range from any lower limit to any upper limit. The above described particle ranges may be achieved by grinding down the materials to the desired particle size or by precipitation of the material from a bottoms up assembly approach. Precipitation of such materials is described in U.S. Patent Application Publication No. 2010/009874, which is assigned to the present assignee and herein incorporated by reference. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

In some embodiments, wellbore fluids of the present disclosure may also include one or more dispersing agents. In some embodiments, the dispersing agents may include at least one of Triton X, sodium dodecyl sulfate (SDS), sodium stearate, dodecylbenzenesulfonates, X-114, CHAPS, DOC, NP-40, cetyl trimethylammonium bromide (CTAB), tetradecyltrimethylammonium bromide (TTAB), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, diocta-decyldimethylammonium bromide (DODAB), MUL-XT™, and combinations thereof.

Advantages

The wellbore fluids of the present disclosure provide various advantages and applications. In some embodiments, the wellbore fluids of the present disclosure can have enhanced electrical conductivities. For instance, in some embodiments, addition of carbon materials to a wellbore fluid may enhance the electrical conductivity of the wellbore fluid by at least about 10% at frequencies ranging from about 1 kHz to about 5 GHz. In some embodiments, addition of carbon materials to a wellbore fluid may enhance the electrical conductivity of the wellbore fluid by at least about 50% at frequencies ranging from about 1 kHz to about 5 GHz.

In addition to enhancing wellbore fluid conductivity, the carbon materials of the present disclosure can also provide additional improvements to wellbore fluids. For instance, in some embodiments, the carbon materials of the present disclosure can be used as rheological modifiers and fluid-loss control agents in the wellbore fluids. Likewise, in some embodiments, the carbon materials of the present disclosure can confer enhanced permeability, enhanced transmission, and enhanced radio frequency (RF) radiation in wellbore fluids. As such, the wellbore fluids of the present disclosure can have numerous applications.

Methods of Logging a Subterranean Well

In some embodiments, the wellbore fluids of the present disclosure can be used for logging a subterranean well. Accordingly, additional embodiments of the present disclosure pertain to methods for logging a subterranean well. In some embodiments, the methods include: (1) placing into the subterranean well a logging medium; and (2) acquiring a log of the subterranean well.

Logging Medium

In some embodiments, the logging medium includes a wellbore fluid of the present disclosure, as previously described in this application. In some embodiments, the logging medium may include at least one of water-in-oil emulsions, oil-in-water emulsions, oil-based wellbore fluids, oil-based muds, and combinations thereof.

In some embodiments, the logging medium includes a non-aqueous fluid and an acid-treated carbon material, where the acid-treated carbon material is present in a concentration to permit logging of the subterranean well.

In some embodiments, the non-aqueous fluid may include an oil-based wellbore fluid, as previously described. In some embodiments, the acid-treated carbon material has been treated with an acid. In some embodiments, the acid includes at least one of hypophosphorous acid, hydrochloric acid, phosphoric acid, sulfuric acid, fuming sulfuric acid, chlorosulfonic acid, and combinations thereof.

In some embodiments, the acid-treated carbon material is functionalized with one or more functionalizing agents. In some embodiments, the functionalizing agents may include at least one of phenyl groups, aniline groups, alkanes, alkyl groups, aryl groups, tert-butyl groups, alkenyl groups, alkynyl groups, ester groups, carboxyl groups, halogens, metals, metal oxides, metal sulfides, sulfate groups, nitrophenyls, and combinations thereof.

In some embodiments, the acid-treated carbon material is intercalated with one or more intercalation agents. In some embodiments, the intercalation agents may include at least one of small molecules, metals, functional groups, and combinations thereof. In some embodiments, the intercalation agents include ammonium persulfate.

In some embodiments, the acid-treated carbon material is exfoliated. In some embodiments, the acid-treated carbon material includes from about 0.0001% to about 10% by volume of the logging medium. In some embodiments, the acid-treated carbon material includes from about 0.01% to about 5% by volume of the logging medium.

In some embodiments, the acid-treated carbon materials in the logging medium of the present disclosure may include at least one of graphene, graphite, graphite oxide, graphene oxide, graphene nanoribbons, graphene oxide nanoribbons, carbon black, carbon nanotubes, amorphous carbons, nanodiamonds, graphene quantum dots, graphite platelets, graphite nano-platelets, exfoliated graphite nano-platelets, thermally expanded graphite, and combinations thereof.

In some embodiments, the logging methods of the present disclosure may also include a step of dispersing the acid-treated carbon materials in the logging medium. In some embodiments, the acid-treated carbon materials are dispersed in the logging medium by adding one or more dispersing agents to the logging medium. In some embodiments, the dispersing agents may include at least one of Triton X, sodium dodecyl sulfate (SDS), sodium stearate, dodecylbenzenesulfonates, X-114, CHAPS, DOC, NP-40, cetyl trimethylammonium bromide (CTAB), tetradecyltrimethylammonium bromide (TTAB), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldimethylammonium bromide (DODAB), MUL-XT™, and combinations thereof.

In some embodiments, the electrical conductivity of the logging medium is enhanced by at least about 10% at frequencies ranging from about 1 kHz to about 5 GHz as a result of adding acid-treated carbon materials. In some embodiments, the electrical conductivity of the logging medium is enhanced by at least about 50% at frequencies ranging from about 1 kHz to about 5 GHz as a result of adding acid-treated carbon materials.

Logging

Various methods may be used to log a subterranean well. In some embodiments, the logging of the subterranean well occurs by electrical logging to acquire an electrical log of the subterranean well. In some embodiments, the electrical log of the subterranean well is acquired by at least one of radio frequency pulses, direct current (DC) pulses, alternating current (AC) pulses, radio waves, microwaves, electromagnetic waves, and combinations thereof. In some embodiments, the electrical log of the subterranean well is acquired at electromagnetic spectra ranging from about 1 kHz to about 5 GHz.

In further embodiments, the logging methods of the present disclosure also include steps of collecting logging data and refining drill location based on the collected logging data. In some embodiments, the logging methods of the present disclosure may also include steps of disposing an electrical well-logging tool in the subterranean well and performing an electrical well-logging survey of the portion of the subterranean well using the well-logging tool.

Applications in Logging while Drilling

In some embodiments, the wellbore fluids and logging medium of the present disclosure can be used in resistivity logging or logging-while-drilling (LWD) operations. A wireline log is generated by lowering a logging tool down the well on a wireline or a drill pipe. The tool is slowly brought back to the surface and the instruments on the logging tool take measurements that characterize the formations penetrated by the well in addition to other important properties of the well. For example, during logging, wireline or electrical logs may use measurements of relative resistivity of the formation to determine geological composition of the downhole formation. Also, during drilling, such resistivity measurements may be useful to determine the location of the drill bit to enhance geosteering capabilities and directional drilling control. Thus, electrical logs and other wireline log techniques are depended upon in the oil and gas exploration industry to determine the nature of the geology and the reservoir properties of the petroleum bearing formations penetrated by the well, as well as other properties of the drilling process (e.g., the location of the drill bit). Further, electrical well logs are often the only record of the formations penetrated by the well available for correlation amongst different wells in a particular field.

When an electrical wireline log is made of a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well. The accurate measurement of resistivity requires the presence of a highly conductive path between the logging tool and the formation (i.e., through the wellbore fluid). The resulting data is a measure of the electrical properties of the drilled formations verses the depth of the well. The results of such measurements may be interpreted to determine the presence or absence of petroleum or gas, the porosity of the formation rock, and other important properties of the well.

An alternative or supplement to wireline and drill-pipe logging involves logging tools placed in specialized drill collar housing and run in the drill string near the bit. This technique is known as logging-while-drilling (LWD) or formation-evaluation-while-drilling (FEWD). Measurements such as electrical resistivity may be thereby taken and stored down hole for later retrieval during a "tripping out" of the drill string, or transmitted to the surface via mud-pulse telemetry or via electrically conductive drill pipes. Such techniques are known to one of skill in the art of well drilling and subterranean well logging.

The wellbore fluids and logging medium of the present disclosure may be utilized with any logging tool or technique. The wellbore fluid may be circulated throughout the entire wellbore. Alternatively, the wellbore fluid may be spotted in the area of the wellbore to be logged. Once the wellbore fluid is in at least a portion of the wellbore, an electrical well-logging tool may be disposed in the portion of the wellbore, and an electrical well-logging survey of the portion of the wellbore may be performed with the well-logging tool. In some embodiments, the wellbore fluid or logging medium may be static for a predetermined period of time in advance of acquiring an electrical log of the subterranean well. The amount of time may vary, but in some embodiments the wellbore fluid or logging medium is static for less than one (1) hour before the electrical log is acquired.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Synthesis of FAPS-GICs

FIG. 1 provides a scheme for the synthesis of fluffy ammonium persulfate graphite intercalation complex (FAPS-GIC) that has been functionalized with various functional groups (including fluoroaniline, F-FAPS-GIC). In a first reaction illustrated in FIG. 1A, graphite was intercalated and expanded using ammonium persulfate (APS) to form FAPS-GIC. In a second reaction illustrated in FIG. 1B, the formed FAPS-GIC was functionalized with different functional groups (including 4-fluoroaniline) using diazonium chemistry to form various functionalized forms of FAPS-GIC (including F-FAPS-GIC). The product obtained from the reaction was filter-washed with the following washing scheme: sulfuric acid, water, DMF, water, acetone and ether.

Similar methods were utilized for synthesize other forms of FAPS-GIC, including FAPS-GIC functionalized with 4-methylaniline (Me-FAPS-GIC), FAPS-GIC functionalized with 4-nitroaniline ($NO_2$-FAPS-GIC), FAPS-GIC functionalized 3-4 consecutive times (e.g., 3F-FAPS-GIC or 4F-FAPS-GIC), FAPS-GIC treated with hypophosphoric acid and functionalized with bromoaniline (HPAT-Br-FAPS-GIC), FAPS-GIC treated with hypophosphoric acid and functionalized with chloroaniline (HPAT-Cl-FAPS-GIC), FAPS-GIC treated with hypophosphoric acid and sulfuric acid (HPAT-$H_2$OT-FAPS-GIC), FAPS-GIC treated with hypophosphoric acid and functionalized with aniline (HPAT-Ph-FAPS-GIC), and FAPS-GIC functionalized with dodecane (C12-FAPS-GIC).

Example 2. Dispersion of FAPS-GICs in OBMs

The purified forms of the synthesized FAPS-GICs were added to various oil-based fluids at various concentrations. The fluids tested included 70:30 oil:water emulsions, Escaid 110 oil-based mud (OBM, 70:30 oil:water), diesel OBM (70:30 oil:water), and Biobase 360B OBM (70:30 oil:water). In some embodiments, additional carbon materials were also added, including multi-walled carbon nanotubes (MWNTs).

The additives were added to 2 mL of fluid and homogenized at 12,000 rpm with a dremel tool for 3 min to produce a suspension. All samples (including base fluids) were homogenized again for 1 min immediately before each conductivity measurement. After adding the additives to the base fluids, the base fluids were also bath-sonicated to disperse the additives. On occasion, the product was also sonicated in 50% $H_3PO_2$ to increase its degree of exfoliation, enhance its ability to disperse, and enhance the added conductivity. On occasion, a dispersing agent was also added (e.g., Triton X-405 or MUL-XT™). For control purposes, various OBMs remained untreated.

Example 3. AC Conductivity Measurements of OBMs with Carbon Materials

AC conductivity measurements of OBMs containing carbon materials were performed using the following setup: a custom 2-terminal probe unit was connected to a Hewlett Packard 3577a vector network analyzer (VNA) through 50Ω matched transmission lines. The transmittance probe consisted of a parallel plate capacitor connected to the input and output lines of the VNA. The plates were flat and circular with areas of 1 $cm^2$, separated by a 2-mm gap and encapsulated in a PTFE (Teflon™) cell. A ground wire was wrapped on the outside of the PTFE casing. To execute a measurement, the space between the plates was filled with the liquid to be analyzed. The electrical transmittivity (or conductivity) of the sample was measured by passing a 0.1 V or 1.0 V input signal through the cell at frequencies ranging from 1 kHz to 1 MHz and subtracting the signal given by the empty cell. The conductivity of air, water, isopropanol and a short circuit were used to calibrate the cell and the device.

Figure 2:
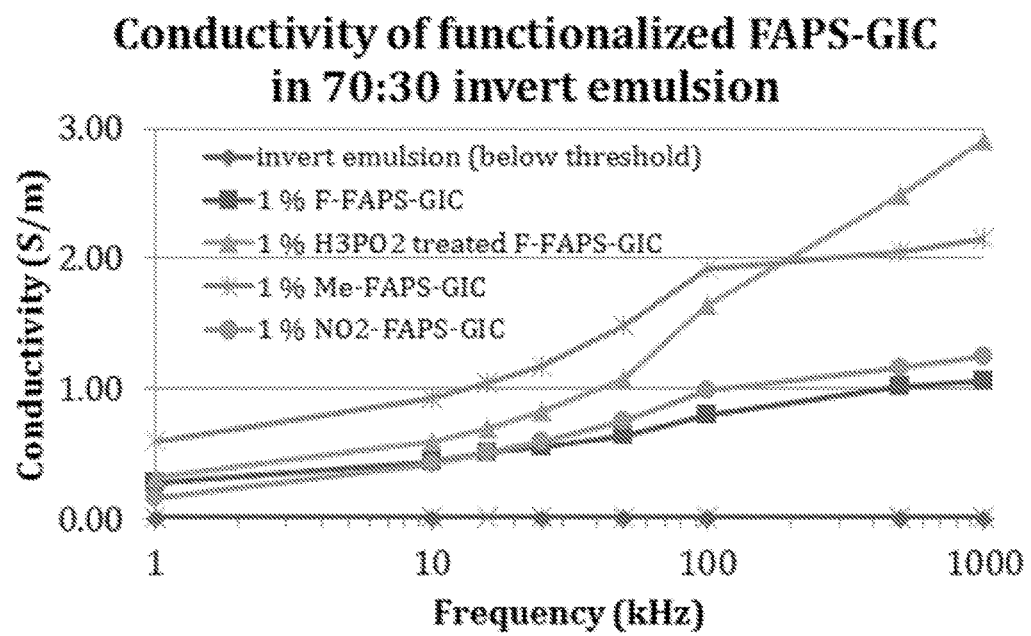
FIG. 2 provides data indicating that different forms of FAPS-GIC can enhance the conductivity of a 70:30 oil:water emulsion (the water phase being 25% $CaCl_2$ brine) at different frequencies. The tested compounds included 1% F-FAPS-GIC (FIG. 1B), 1% F-FAPS-GIC exfoliated with $H_3PO_2$, 1% FAPS-GIC functionalized with 4-methylaniline (Me-FAPS-GIC), and 1% FAPS-GIC functionalized with 4-nitroaniline ($NO_2$-FAPS-GIC). The results indicate that the conductivities of the nanoparticle suspensions are orders of magnitude above the threshold and above the conductivity of the emulsion without additives.

Various conductivity measurements are summarized in FIG. 2. In particular, Graph 1 shows conductivity enhancement of 70:30 oil-on-water (30:70 water-in-oil) emulsions, where different conductive additives were used at 1% w/w concentrations (i.e., F-FAPS-GIC, F-FAPS-GIC exfoliated with $H_3PO_2$, Me-FAPS-GIC, and $NO_2$—FAPS-GIC). These results indicate that the conductivities of the nanoparticle suspensions are orders of magnitude above the conductivity of the emulsion without additives.

Figure 3:
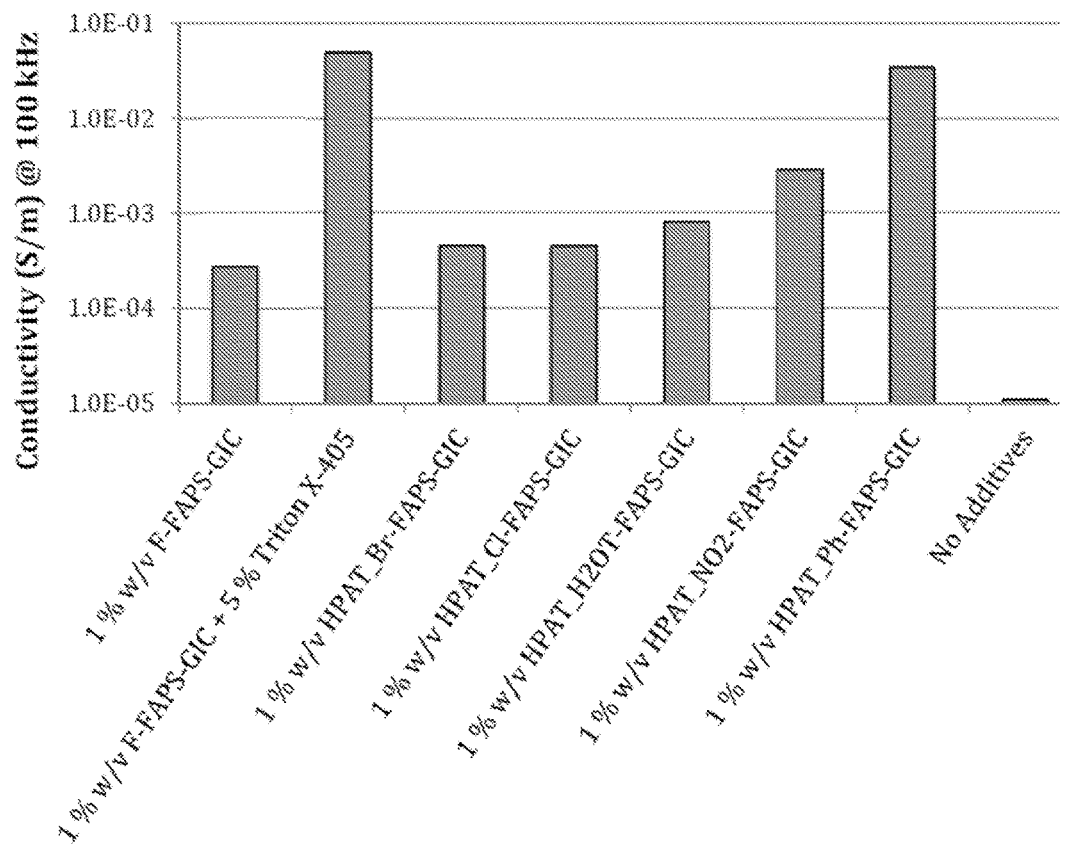
FIG. 3 provides data indicating the AC conductivities at 100 kHz for Escaid 110 70:30 invert emulsions with differently functionalized FAPS-GICs, including F-FAPS-GIC, FAPS-GIC treated with hypophosphoric acid and functionalized with bromoaniline (HPAT-Br-FAPS-GIC), FAPS-GIC treated with hypophosphoric acid and functionalized with chloroaniline (HPAT-Cl-FAPS-GIC), FAPS-GIC treated with hypophosphoric acid and sulfuric acid (HPAT-$H_2$OT-FAPS-GIC), FAPS-GIC treated with hypophosphoric acid and functionalized with nitroaniline (HPAT-$NO_2$-FAPS-GIC), and FAPS-GIC treated with hypophosphoric acid and functionalized with aniline (HPAT-Ph-FAPS-GIC). Addition of all FAPS-GICs at concentrations as low as 1% increases the base conductivity of the invert emulsion. Addition of Triton X-405, a non-ionic surfactant, improves the dispersion stability of the additives and the conductivity improves further.

FIG. 3 provides data indicating that various carbon material additives can enhance the conductivity of an Escaid 110 70:30 oil:water emulsion at a frequency of 100 kHz. The tested carbon material additives included F-FAPS-GIC, HPAT-Br-FAPS-GIC, HPAT-Cl-FAPS-GIC, HPAT-$H_2$OT-FAPS-GIC, HPAT-Ph-FAPS-GIC, and combinations thereof. Tests were conducted in the presence or absence of various dispersing agents, such as Triton X-405 and MUL-XT™.

Figure 4:
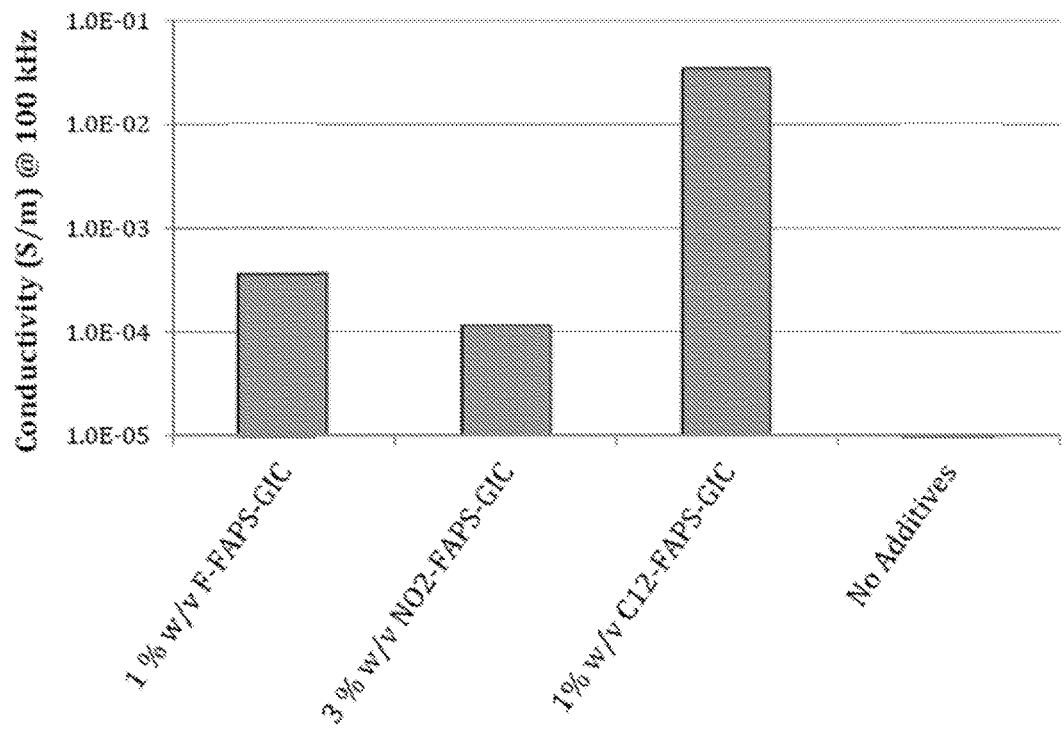
FIG. 4 provides data indicating the AC conductivities at 100 kHz for Escaid 110 (weighing agent A) 70:30 OBM with differently functionalized FAPS-GICs, including F-FAPS-GIC, $NO_2$-FAPS-GIC, and dodecane-functionalized FAPS-GIC (C12-FAPS-GIC). Addition of all FAPS-GICs at concentrations as low as 1% increases the base conductivity of this OBM. C12-FAPS-GIC has a higher performance than other additives for this formulation.

FIG. 4 provides data indicating that various carbon material additives can enhance the conductivity of an Escaid 110 oil-based mud (OBM, 70:30 oil:water emulsion) at 100 kHz. The tested carbon material additives included F-FAPS-GIC, $NO_2$-FAPS-GIC, C12-FAPS-GIC, and combinations thereof. Tests were conducted in the presence or absence of various dispersing agents, such as Triton X-405.

Figure 5:
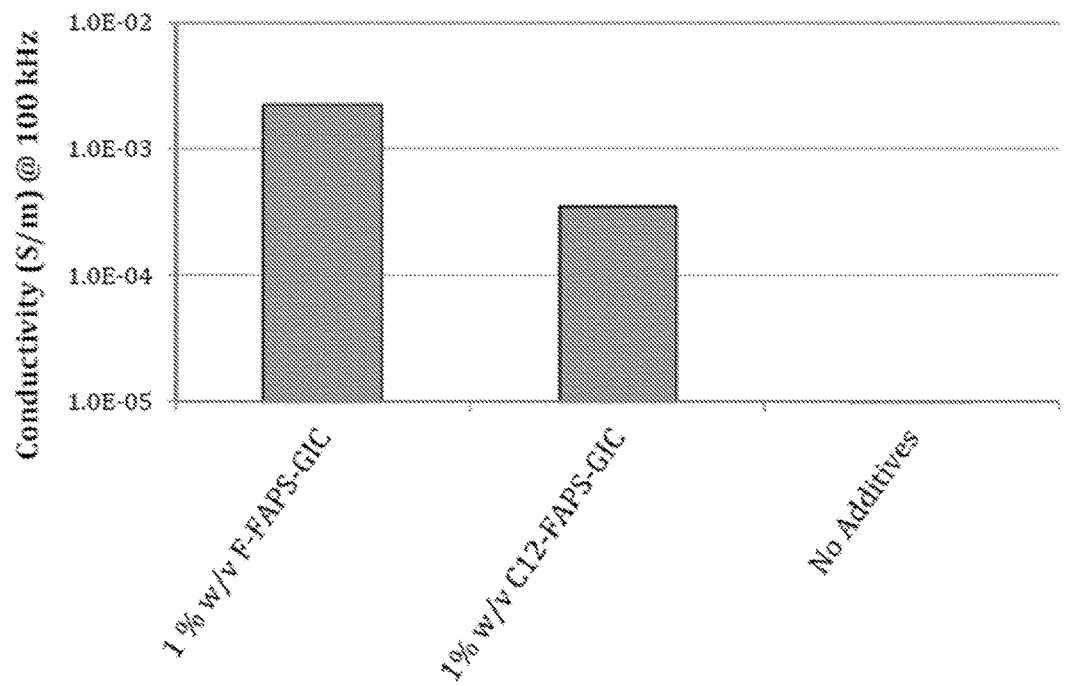
FIG. 5 provides data indicating the AC conductivities at 100 kHz for diesel (weighing agent A) 70:30 OBM with differently functionalized FAPS-GICs, including F-FAPS GIC and C12-FAPS-GIC. Addition of all FAPS-GICs at concentrations as low as 1% increases the base conductivity of these OBMs. F-FAPS-GIC has a higher performance than other additives in this formulation.

FIG. 5 provides data indicating that various carbon material additives can enhance the conductivity of a diesel OBM (70:30 oil:water) at 100 kHz. The tested carbon material additives included F-FAPS-GIC and C12-FAPS-GIC. Tests were conducted in the presence or absence of various dispersing agents, such as Triton X-405.

Figure 6:
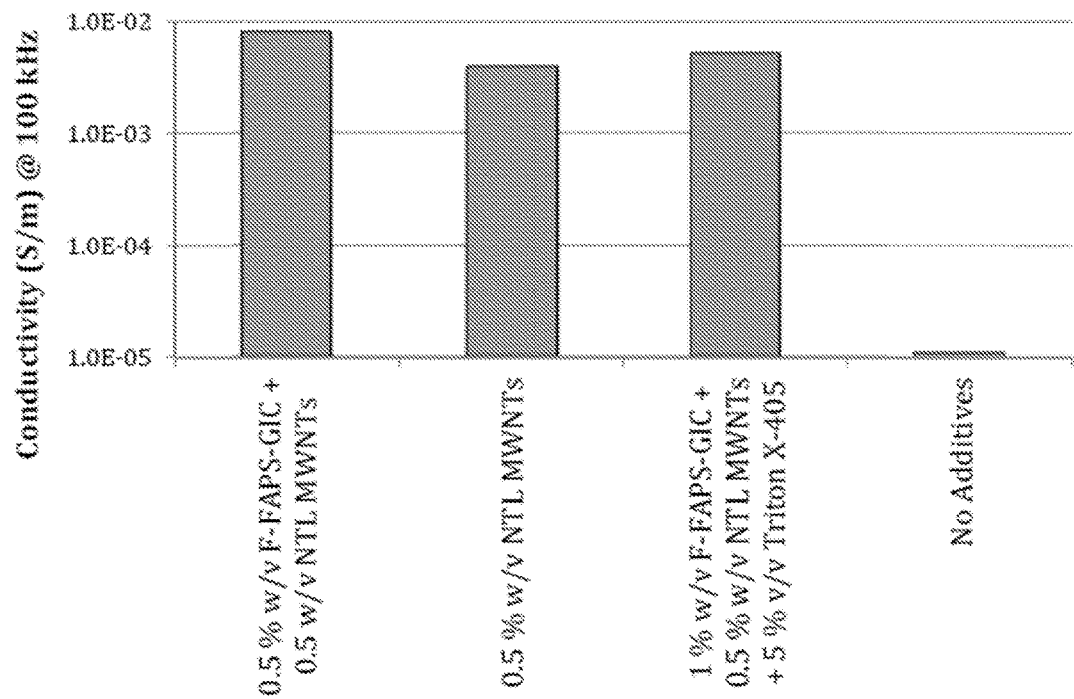
FIG. 6 provides data indicating the AC conductivities at 100 kHz for Escaid 110 70:30 invert emulsion with NTL MWNTs and differently functionalized FAPS-GICs, including F-FAPS GIC. Addition of NTL MWNTs at concentrations as low as 0.5% increases the base conductivity of this invert emulsion. F-FAPS-GIC and/or Triton X-405 in combination with the NTL MWNTs increase the conductivity further.

FIG. 6 provides data indicating that NTL MWNTs and F-FAPS-GICs can enhance the conductivity of an Escaid 110 OBM at 100 kHz.

Figure 7:
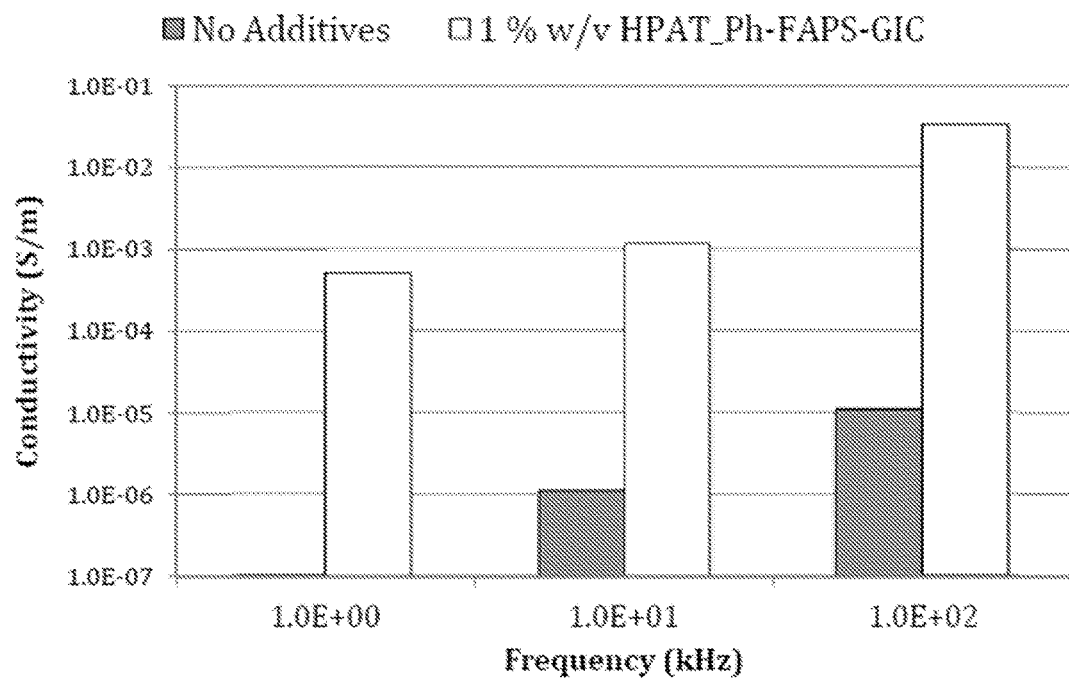
FIG. 7 provides data indicating the AC Conductivities for an Escaid 110 70:30 invert emulsion containing 1% w/v Ph-FAPS-GIC at different frequencies. Addition of 1% Ph-FAPS-GIC increases the base conductivity of this invert emulsion at all frequencies. The conductivity of formulations increases with higher frequency.
Figure 8:
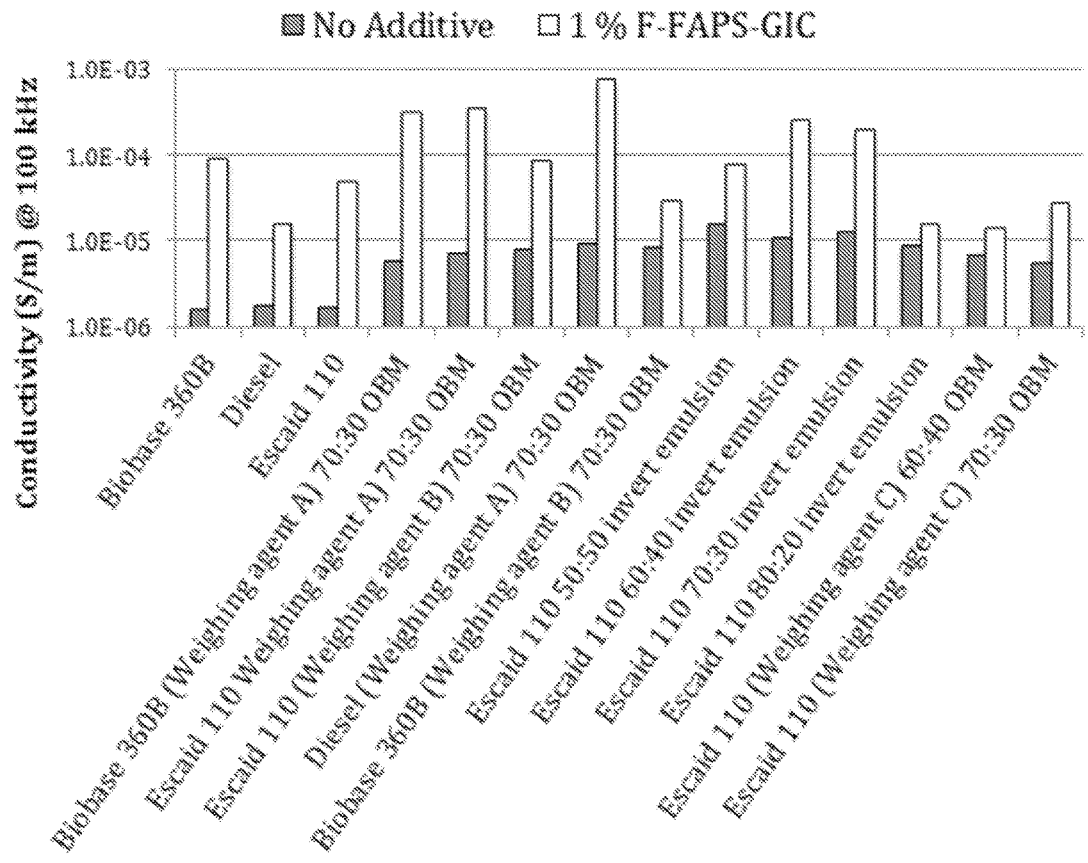
FIG. 8 provides data indicating the AC conductivities for different base fluids with 1% w/v F-FAPS-GIC at 100 kHz. Addition of 1% F-FAPS-GIC increases the base conductivity of all base formulations.

FIG. 7 provides data indicating that 1% HPAT-Ph-FAPS-GIC enhances the AC conductivity of Escaid 110. Finally, FIG. 8 compares the effects of 1% F-FAPS-GIC on enhancing the conductivities of different base fluids.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method for logging a subterranean well, wherein the method comprises:
   treating a carbon material with at least one acid to provide an acid-treated carbon material,
   wherein the at least one acid comprises at least hypophosphoric acid, and
   wherein the acid-treated carbon material is selected from the group consisting of graphene-based carbon materials, graphite-based carbon materials, and combinations thereof;
   adding the acid-treated carbon material to a non-aqueous fluid to provide a logging medium,
   wherein the acid-treated carbon material is present in the logging medium at a concentration to permit logging of the subterranean well;
   placing the logging medium into the subterranean well; and
   acquiring a log of the subterranean well.

2. The method of claim 1, wherein the logging of the subterranean well comprises electrical logging, and wherein the electrical logging acquires an electrical log of the subterranean well.

3. The method of claim 2, wherein the electrical log of the subterranean well is acquired by at least one of radio frequency pulses, direct current (DC) pulses, alternating current (AC) pulses, radio waves, microwaves, electromagnetic waves, and combinations thereof.

4. The method of claim 2, wherein the electrical log of the subterranean well is acquired at electromagnetic spectra ranging from about 1 kHz to about 5 GHz.

5. The method of claim 1, wherein the at least one acid further comprises at least one selected from the group consisting of hydrochloric acid, phosphoric acid, sulfuric acid, fuming sulfuric acid, chlorosulfonic acid, and combinations thereof.

6. The method of claim 1, wherein the acid-treated carbon material is functionalized with one or more functionalizing agents.

7. The method of claim 6, wherein the functionalizing agents are selected from the group consisting of phenyl groups, aniline groups, alkanes, alkyl groups, aryl groups, tent-butyl groups, alkenyl groups, alkynyl groups, ester groups, carboxyl groups, halogens, metals, metal oxides, metal sulfides, sulfate groups, nitrophenyls, and combinations thereof.

8. The method of claim 1, wherein the acid-treated carbon material is intercalated with one or more intercalation agents.

9. The method of claim 8, wherein the intercalation agents are selected from the group consisting of small molecules, metals, functional groups, and combinations thereof.

10. The method of claim 8, wherein the intercalation agents comprise ammonium persulfate.

11. The method of claim 1, wherein the acid-treated carbon material is exfoliated.

12. The method of claim 1, wherein the acid-treated carbon material comprises from about 0.0001% to about 10% by volume of the logging medium.

13. The method of claim 1, wherein the acid-treated carbon material comprises graphene-based carbon materials, and wherein the graphene-based carbon materials are selected from the group consisting of graphene oxide, graphene nanoribbons, graphene oxide nanoribbons, functionalized graphene nanoribbons, graphene quantum dots, and combinations thereof.

14. The method of claim 1, wherein the acid-treated carbon material comprises graphite-based carbon materials, and wherein the graphite-based carbon materials are is selected from the group consisting of functionalized graphite, graphite oxide, graphite platelets, graphite nano-platelets, exfoliated graphite, exfoliated graphite nano-platelets, thermally expanded graphite, graphite intercalated with one or more intercalation agents to form graphite intercalation complexes, and combinations thereof.

15. The method of claim 1, wherein the electrical conductivity of the logging medium is enhanced by at least about 10% at frequencies ranging from about 1 kHz to about 5 GHz by the acid-treated carbon materials.

16. The method of claim 1, wherein the electrical conductivity of the logging medium is enhanced by at least about 50% at frequencies ranging from about 1 kHz to about 5 GHz by the acid-treated carbon materials.

17. The method of claim 1, wherein the logging medium is selected from the group consisting of water-in-oil emulsions, oil-based wellbore fluids, oil-based muds, and combinations thereof.

18. The method of claim 1, further comprising a step of dispersing the acid-treated carbon materials in the logging medium.

19. The method of claim 18, wherein the acid-treated carbon materials are dispersed in the logging medium by adding one or more dispersing agents to the logging medium.

20. The method of claim 19, wherein the dispersing agents are selected from the group consisting of Triton X, sodium dodecyl sulfate (SDS), sodium stearate, dodecylbenzenesulfonates, X-114, CHAPS, DOC, NP-40, cetyl trimethylammonium bromide (CTAB), tetradecyitrimethyi ammonium bromide (TTAB), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldimethylammonium bromide (DODAB), MUL-XT™, and combinations thereof.

21. The method of claim 1, further comprising:
collecting logging data; and
refining drill location based on the collected logging data.

22. The method of claim 1, further comprising:
disposing an electrical well-logging tool in the subterranean well; and
performing an electrical well-logging survey of the portion of the subterranean well using the well-logging tool.

23. A method for logging a subterranean well, wherein the method comprises:
placing a logging medium into the subterranean well,
wherein the logging medium, comprising a non-aqueous fluid and an acid-treated carbon material, is an invert micro-emulsion or an invert emulsion with a non-oleaginous phase, distributed in an oleaginous phase, having an average diameter in a range of 0.5 to 5 microns,
wherein the acid-treated carbon material is selected from the group consisting of graphene-based carbon materials, graphite-based carbon materials, and combinations thereof, and
wherein the acid-treated carbon material is present in the logging medium at a concentration to permit logging of the subterranean well; and
acquiring a log of the subterranean well.

24. The method of claim 23, wherein the range of the average diameter is 1 to 3 microns.

* * * * *